(12) United States Patent
Roy

(10) Patent No.: US 8,235,072 B2
(45) Date of Patent: Aug. 7, 2012

(54) METHOD AND APPARATUS FOR MULTIBARRIER PLASMA ACTUATED HIGH PERFORMANCE FLOW CONTROL

(75) Inventor: Subrata Roy, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 398 days.

(21) Appl. No.: 12/598,993

(22) PCT Filed: May 8, 2008

(86) PCT No.: PCT/US2008/063090
§ 371 (c)(1),
(2), (4) Date: Nov. 5, 2009

(87) PCT Pub. No.: WO2009/005895
PCT Pub. Date: Jan. 8, 2009

(65) Prior Publication Data
US 2010/0127624 A1    May 27, 2010

Related U.S. Application Data

(60) Provisional application No. 60/928,207, filed on May 8, 2007.

(51) Int. Cl.
*F15C 1/04* (2006.01)
(52) U.S. Cl. .................. 137/825; 315/111.21
(58) Field of Classification Search ............ 315/111.21, 315/111.41, 111.61, 111.71; 137/827, 825
See application file for complete search history.

(56) References Cited

U.S. PATENT DOCUMENTS

| 5,669,583 | A  | 9/1997 | Roth |
| 5,938,854 | A  | 8/1999 | Roth |
| 6,079,345 | A  | 6/2000 | Tsunoda |
| 6,247,671 | B1 | 6/2001 | Saeks et al. |
| 6,538,387 | B1 | 3/2003 | Seki et al. |
| 6,664,737 | B1* | 12/2003 | Berry et al. ............... 315/111.21 |
| 7,098,420 | B2 | 8/2006 | Crowe et al. |
| 2004/0118973 | A1 | 6/2004 | Malmuth et al. |
| 2006/0005545 | A1 | 1/2006 | Samimy et al. |
| 2007/0089795 | A1 | 4/2007 | Jacob |

FOREIGN PATENT DOCUMENTS

EP    1995173    11/2008

OTHER PUBLICATIONS

Wilkinson, Stephen, P., "Investigation of an Oscillating Surface Plasma for Turbulent Drag Reduction", AIAA, No. 2003-1023.
Enloe, C.L., et al., "Plasma Structure in the Aerodynamic Plasma Actuator", AIAA, $42^{nd}$ Aerospace Sciences Meeting & Exhibit, Jan. 5-8, 2004.

* cited by examiner

*Primary Examiner* — David Hung Vu
(74) *Attorney, Agent, or Firm* — Saliwanchik, Lloyd & Eisenschenk

(57) ABSTRACT

A plasma actuator incorporates a power source, a first electrode in contact with a first dielectric layer, a second electrode in contact with a second dielectric layer, and a ground electrode. The power source drives the first electrode with a first ac voltage pattern with respect to the ground electrode to produce a first plasma discharge, and a first electric field pattern in the flow region, and drives the second electrode with a second ac voltage pattern with respect to the ground electrode to produce a second plasma discharge in the flow region and a second electric field pattern in the flow region. The first and second electrodes are offset along the direction of flow and the first voltage pattern and the second voltage pattern have a phase difference such that the first and second electric fields drive flow in different portions of the flow region at different times.

50 Claims, 22 Drawing Sheets

METHOD AND APPARATUS FOR MULTIBARRIER PLASMA ACTUATED HIGH PERFORMANCE FLOW CONTROL

CROSS-REFERENCE TO RELATED APPLICATION

The present application is the U.S. National Stage Application of International Patent Application No. PCT/US2008/063090, filed on May 8, 2008, which claims the benefit of U.S. Application Ser. No. 60/928,207, filed May 8, 2007, both of which are hereby incorporated by reference herein in their entirety, including any figures, tables, or drawings.

The subject invention was made with government support under a research project supported by AFOSR Grant Nos. FA9550-05-1-0074 and FA9550-07-1-0131.

BACKGROUND OF THE INVENTION

Active flow control is useful for various applications. For example, in propulsion, low-pressure turbines use highly loaded airfoils to improve efficiency and to reduce the number of blades required. The boundary layers, which are fully turbulent at take off, become transitional at high altitudes because of the change in operating environment at cruise. Under such off-design conditions, separation can occur and performance may be impaired. Similarly, in external aerodynamics, the maximum lift and stall characteristics of a wing affect take off and landing distance, maximum and sustained turn rates, climb and glide rates and flight ceiling.

Thus, an efficient device is desired to mitigate performance deficiencies encountered in many practical applications at off-design conditions. Control of subsonic flows employing plasma-induced body forces is currently a topic of considerable interest. This is motivated by several distinct advantages associated with plasma actuators, including the absence of complicated mechanical or pneumatic systems and their moving parts, the absence of mass injection and thus mechanical inertia, their potential for near-instantaneous deployment and operation over a broad range of frequencies, their relatively low power consumption, rapid switch on/off capabilities, and the potential of electromagnetic forces to apply large forces in a relatively precise manner. Additionally, plasma-based devices are capable of operating at atmospheric conditions without uncontrolled macroscopic breakdown.

Recent experiments and numerical studies have successfully demonstrated striking flow control effects of radio frequency (RF) induced dielectric barrier discharge (DBD) at low speeds.

Low-speed flow control typically employs RF dielectric barrier discharge (DBD) to generate a near-surface body force that can reattach separated flows through an induced wall-jet. FIGS. 1 and 2 show schematics of RF induced atmospheric glow discharge for paraelectric (in FIG. 1) and peristaltic (in FIG. 2) flow acceleration at low speed. Surface discharge is the focus of the design shown in FIG. 2, in which one dielectric coated electrode is typically exposed to the flow surface, while the other is grounded and embedded in a layer of insulator and displaced a short streamwise distance from it. FIGS. 1 and 2 illustrate typical arrangements of a monolayer design. An RF voltage is applied to the electrode exposed to the gas. The electric field generated by the discharge is due to the geometric asymmetry as well as the vastly disparate mobility of the electrons and ions. The plasma at this pressure is highly collisional, causing an efficient energy exchange between charged and neutral species. The net forces generated by the intermittent discharge induce ion-"wind," while ion-neutral collision transfer mechanisms generate the desired surface wall-jet-like effect. The response of the fluid to these forces requires some charged and neutral species interaction past complex configurations under conditions where transition and turbulence are dominant.

The standard monolayer designs shown in FIGS. 1 and 2 can produce discharge when several kilovolts are applied across the two electrodes separated by the layer of dielectric. This discharge induces body force in a small region resulting in a weak wall jet. Applications of polyphase RF power supply to the electrodes can nearly double the induced velocity as schematically shown in the right end of FIG. 2. However, that requires considerable power and an expensive power supply. Thus, the illustrated design requires a kHz RF power supply and can arc, making the discharge unstable.

These actuators operate at reasonable power consumption levels at lower speeds but lose performance at higher flow speeds, in which case a magnetic field is applied to induce additional Lorentz forces for effective control. This significantly increases the power requirement. Moreover, the RF transformers, along with the power supply needed to produce these discharges, are cumbersome and not suitable for many onboard applications.

Thus, the need exists for a plasma actuator design that can be applied at higher speeds and that can be used for onboard applications.

BRIEF SUMMARY

Embodiments of the invention relate to a method and apparatus for plasma actuated high performance flow control. A specific embodiment of a plasma actuator can incorporate a power source; a first electrode in contact with a first dielectric layer and connected to the power source; a second electrode in contact with a second dielectric layer and connected to the power source; and a ground electrode. The power source drives the first electrode with a first ac voltage pattern with respect to the ground electrode and drives the second electrode with a second ac voltage pattern with respect to the ground electrode such that application of the first voltage pattern produces a first plasma discharge in a flow region, and a first electric field pattern in the flow region, and application of the second voltage pattern produces a second plasma discharge in the flow region and a second electric field pattern in the flow region. The first and second electrodes are offset along the direction of flow in the flow region and the first voltage pattern and the second voltage pattern have a phase difference such that the first and second electric fields drive flow in the flow region in different portions of the flow region at different times.

In an embodiment, the first dielectric and the second dielectric layer are arranged in a stacked configuration, such that the first dielectric layer contacts the second dielectric layer. The first electrode can be positioned near the flow region. The first dielectric can be positioned between the flow region and the second electrode such that both electrodes are positioned in the same direction from the flow region. Alternatively, the flow region, or at least a portion of the flow region can be positioned between the first and second electrodes. The first dielectric insulator layer and the second dielectric insulator layer have different dielectric strengths or can have the same dielectric strengths. The first electrode is offset from the second electrode in a direction parallel to a direction of flow in the flow region and one or more additional electrodes can be offset from the first and second electrodes and provide corresponding one or more additional electric fields to promote flow in the flow region.

DETAILED DISCLOSURE

Embodiments of the invention relate to a method and apparatus for multibarrier plasma actuated high performance flow control. A specific embodiment pertains to a plasma actuator design that results in a dramatic increase in induced velocity at a power consumption level similar to that of a standard monolayer plasma actuator design. In one embodiment, a plasma actuator design of the present disclosure involves a multilayer arrangement of dielectric barriers between sets of electrodes. In a specific embodiment, a multilayer actuator is particularly suitable for flow control in moderate to high speed applications, including those in the aerospace and automotive industries.

Embodiments are directed to the use of a multilayer or multibarrier plasma actuator design having several layers of a dielectric substrate, each layer enveloping an electrode. In one embodiment, the inter-electrode gap is kept at a few microns to decrease the power requirement. Various configurations include differences in the number of insulation layers, insulation thicknesses, dielectric strengths, number of electrodes, electrode widths, inter-electrode gaps, applied frequencies, duty cycles, and voltages, for example.

Several advantages of various embodiments of an actuator design in accordance with the subject invention can include one or more of the following: active flow control; increased area of plasma formation; significant increase in body force generation for higher flow inducement; significantly lower power requirement; no mechanical components; decreased cost; and microscale applications.

Figure 3:
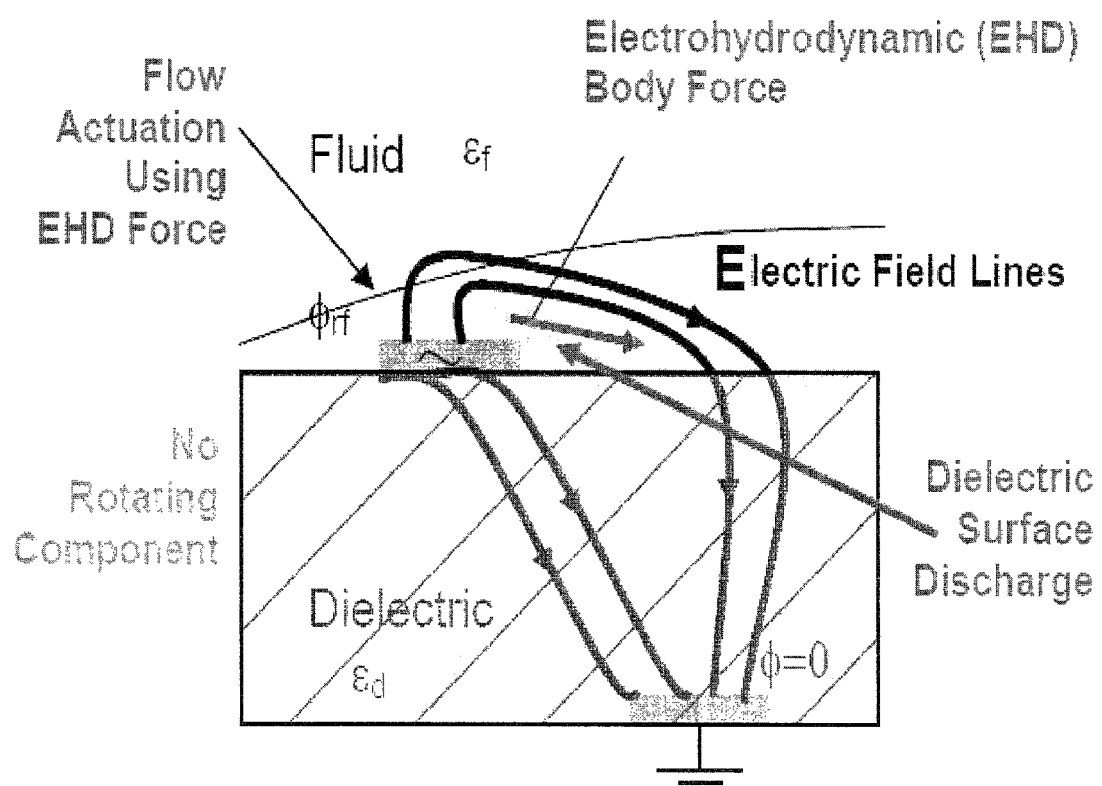
FIG. 3 is a schematic diagram for flow actuation using surface dielectric barrier discharge (DBD).
Figure 4:
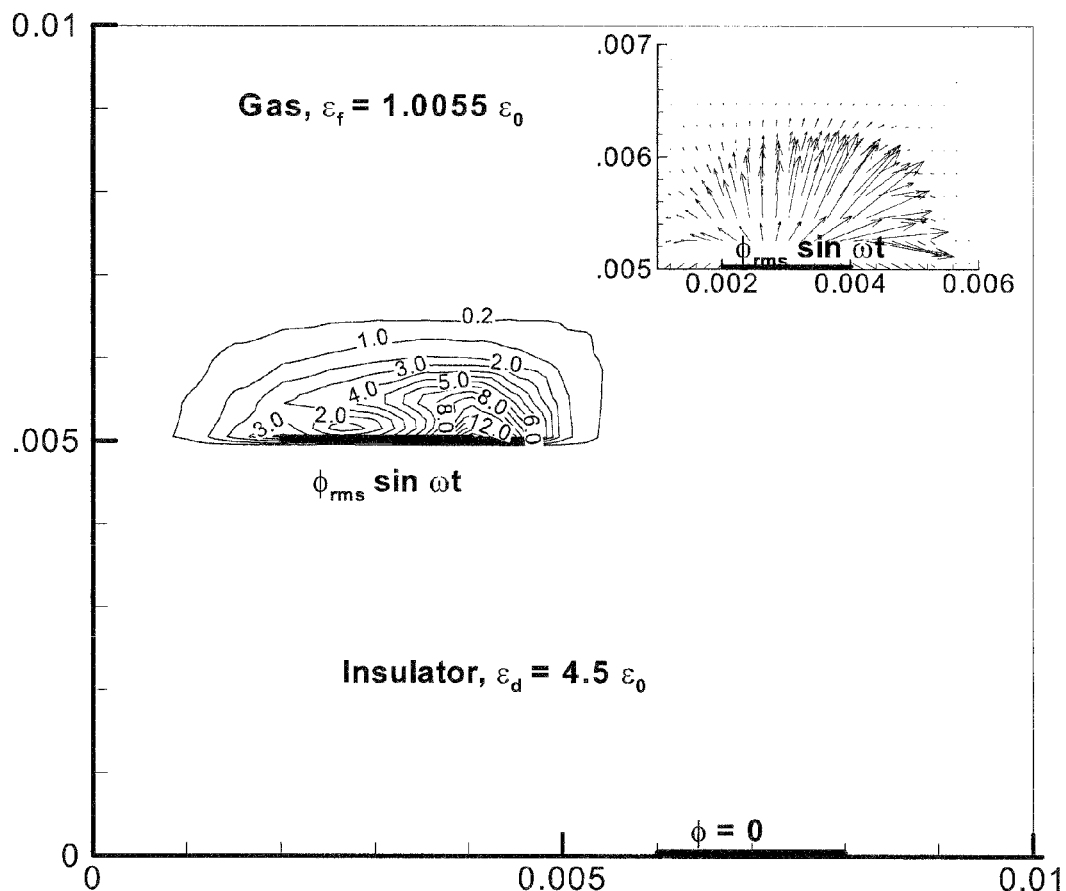
FIG. 4 is a diagram showing force variation of electric body force qE about the electrode-dielectric surface.
Figure 5:
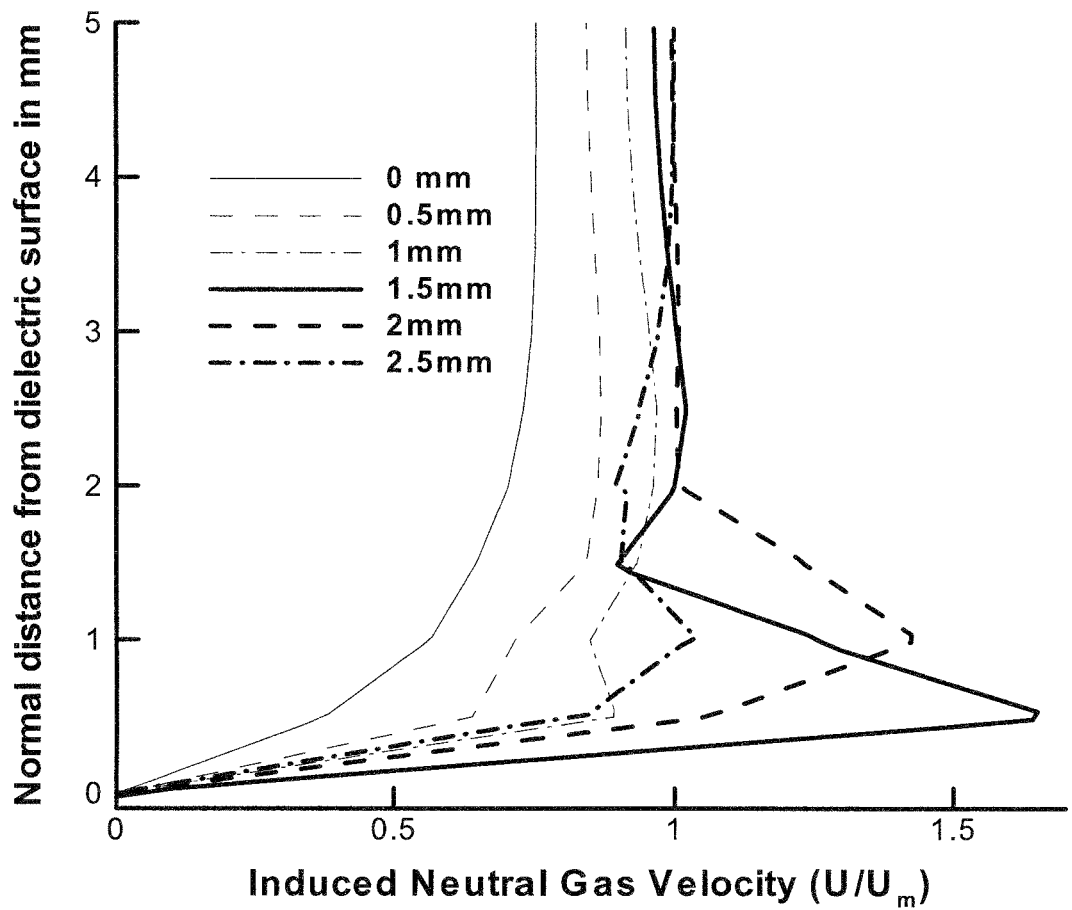
FIG. 5 is a diagram showing predicted streamwise gas velocity profiles induced by a body force, shown along different locations along the flow under a quiescent gas environment.

FIGS. 3-5 illustrate the process through which an electrodynamic qE body force actively controls the flow through an inducement of a wall jet in a quiescent condition. FIG. 3 shows the schematic for flow actuation using surface dielectric barrier discharge (DBD). Two electrodes are employed: the first exposed to the flow and the second embedded in the dielectric and displaced in the streamwise direction relative to the exposed electrode. The surface discharge so created contrasts with the volumetric effect observed when the electrodes are separated by the fluid. Typically, the actuator is excited by powering the exposed electrode at RF voltages, while the embedded electrode is grounded. In another arrangement, both electrodes are powered with signals separated by a beat frequency. The excitation induces a complex unsteady interaction between the two electrodes and the fluid, details of which depend on frequency, voltage, geometric configuration, and dielectric constants of the media.

In the surface discharge, within a very short time after breakdown, the discharge buildup at the dielectric surface sets off microdischarges of nanosecond duration, limiting the electric field at the location of the microdischarge such that the charge current at this position is cut off Experimental evidence shows that there is no runaway state for the parameters under consideration and that an asymptotic (quasi) periodic state is reached, with a dominant frequency that is locked to the input perturbation. For a given interelectrode distance, as the applied voltage becomes sufficiently large, the dielectric surface adjacent to the RF electrode produces a barrier discharge, which weakly ionizes the surrounding gas. The combination of electrodynamic body force and collisional processes, whose detailed mechanics remain a matter of current research, ultimately transfers momentum acquired from the electric field by the charged particles to the neutrals which are the primary species.

Advantages of dielectric barrier-based discharges include, for example, an absence of moving parts, rapid on-off features, and the ability to apply body forces in a relatively precise manner by deploying advanced electromagnetic technology. Embodiments of the subject invention are thus suitable for flow control in wall layers or separated layers, for example. The main parameters applied in experimental observations include peak-to-peak voltage between about 2-20 kV at about 1-50 kHz RF, which are suitable for actuation at atmospheric pressure at low speeds to 0(10) Torr at high speeds. Specifically, at high pressures the fluid is highly collisional, inducing an efficient momentum transfer between charged and neutral species.

The electric field E exerts a net force qE through the space charge (q) separated plasma within the DBD. This microfilamentary discharge sustains an optical glow within a half cycle through many current pulses of nanosecond duration. The plasma can induce air flow up to several meters per second in atmospheric pressure. The parameters controlling such force include the applied voltage, frequency, dielectric characteristics, and the asymmetric configuration of the electrodes. The asymmetry in the location of the electrodes, coupled with the phase shift of the electrode when multiple devices are present, yields a directional asymptotic "push" on the bulk gas. The thickness of the exposed electrode affects the thrust produced by the actuator.

The variation of electric body force qE about the electrode-dielectric surface in FIG. 4 is predicted by using a multispecies formulation anchored in a high-fidelity finite element based multiscale ionized gas (MIG) flow code. The MIG code employs a self-consistent approach to model the near-wall physics of plasma gas interactions. The method is based on a versatile finite-element (FE) procedure adapted from fluid dynamics to overcome the stiffness of the equations generated by multi-species charge separation phenomena. A 2D bilinear finite element formulation is chosen with $4^{th}$ order Runge-Kutta time marching. The solution process consists of two steps. The first solves the equations for charge and electric field simultaneously. In the second step, the force no obtained is transferred to the airfoil after rotation and scaling. The MIG code also solves for the self-consistent fluid response. This implicitly assumes that the near-wall local fluid neutral velocity does not influence the distribution of electric parameters. This requires that the fluid density and pressure, or collisionality, are not much different from those employed in the plasma calculation. This is a reasonable expectation for the low-speed atmospheric pressure incompressible flows here.

The result computed for helium working gas describes a localized peak of the body force in the vicinity of the exposed electrode powered with a RF voltage of 1 kV rms at 5 kHz. The predicted streamwise gas velocity profiles induced by this force are shown along different locations in FIG. 5 under a quiescent gas environment. For atmospheric air, the induced peak velocity of the wall jet is about 1-2 m/s, which may be further accentuated by using a polyphase power supply. While this creates striking flow control effects at low speeds, the induced momentum may be too small for sufficiently actuating the high speed flows.

Figure 6:
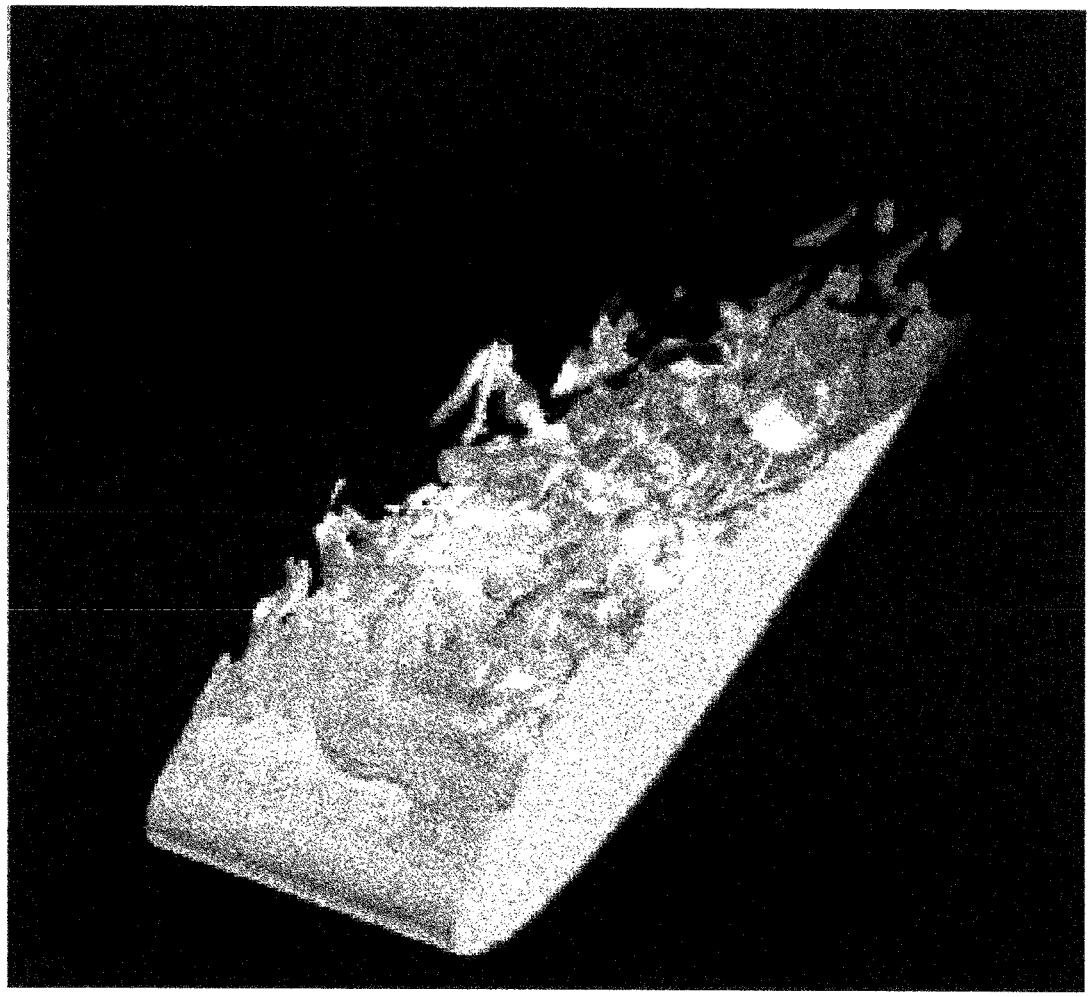
FIG. 6 is a 3-D simulation showing vortical structure of a separated flow.
Figure 7:
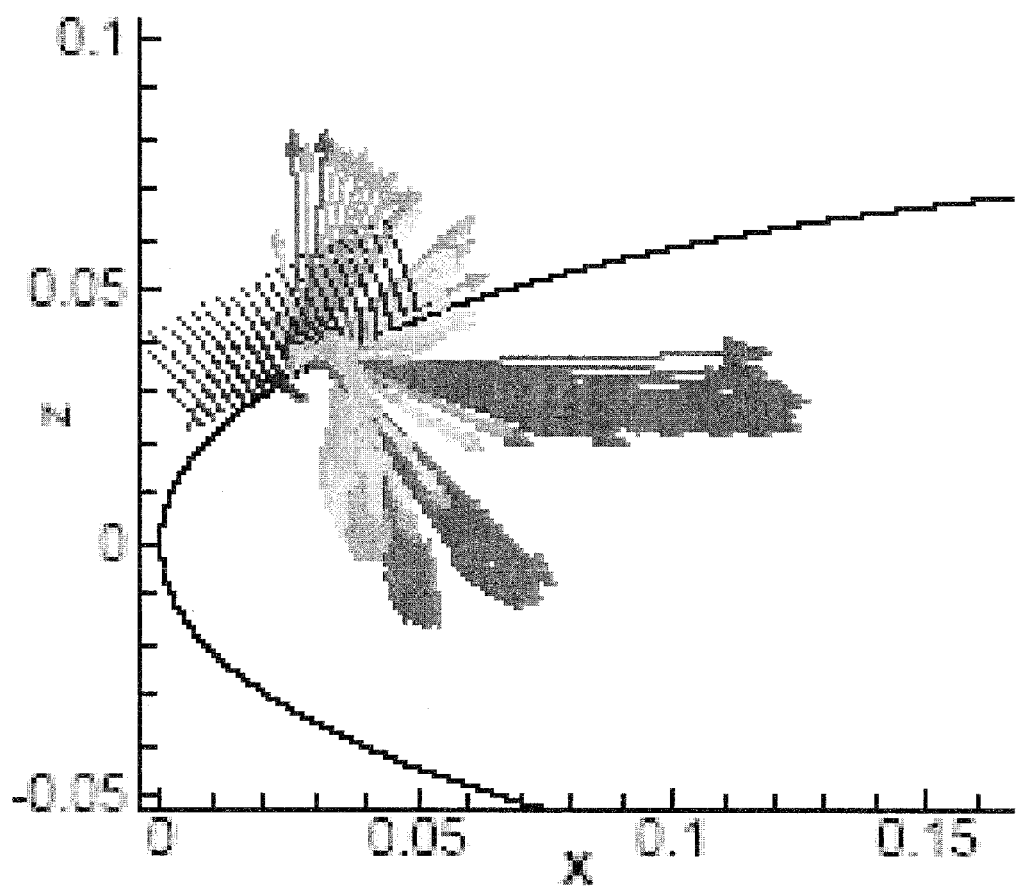
FIG. 7 is a diagram showing instantaneous electrohydrodynamic (EHD) force qE at p/2.
Figure 8:
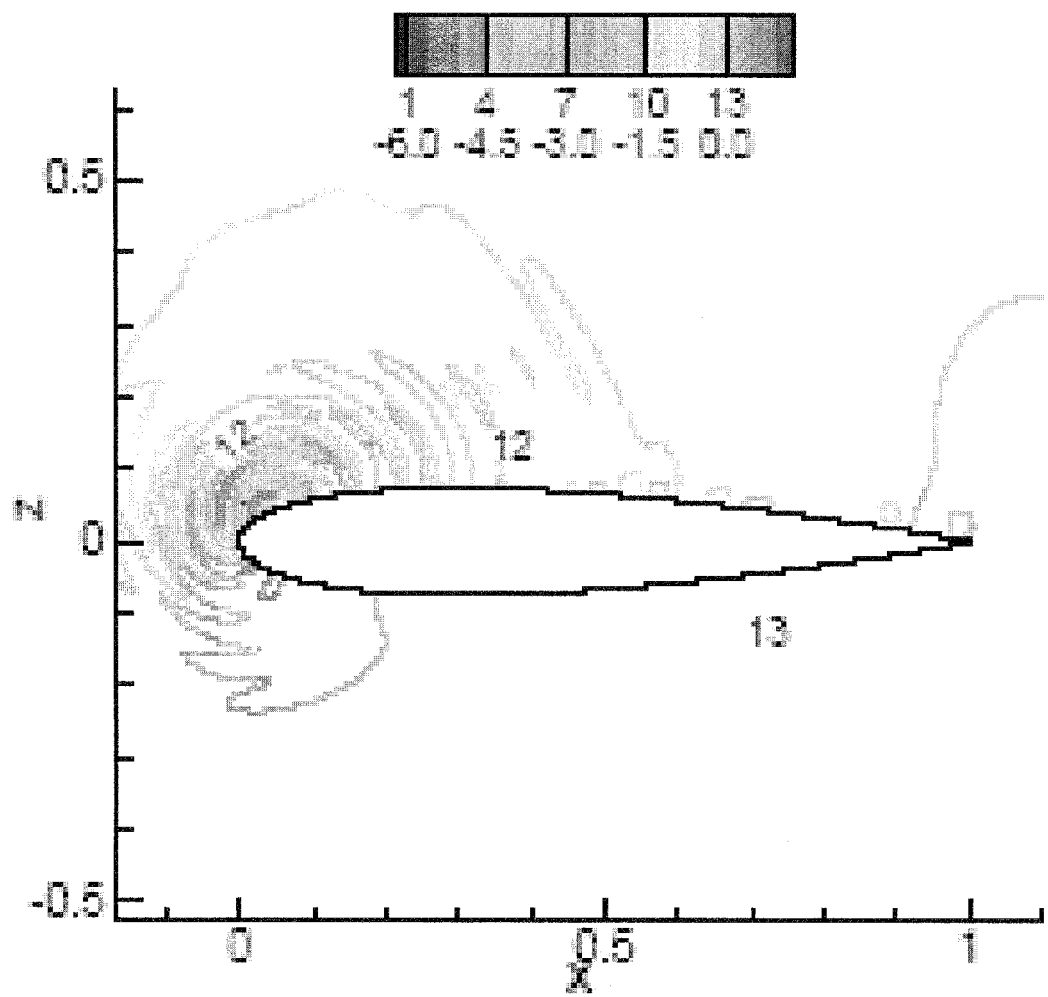
FIG. 8 is a diagram showing an instantaneous pressure solution.
Figure 9:
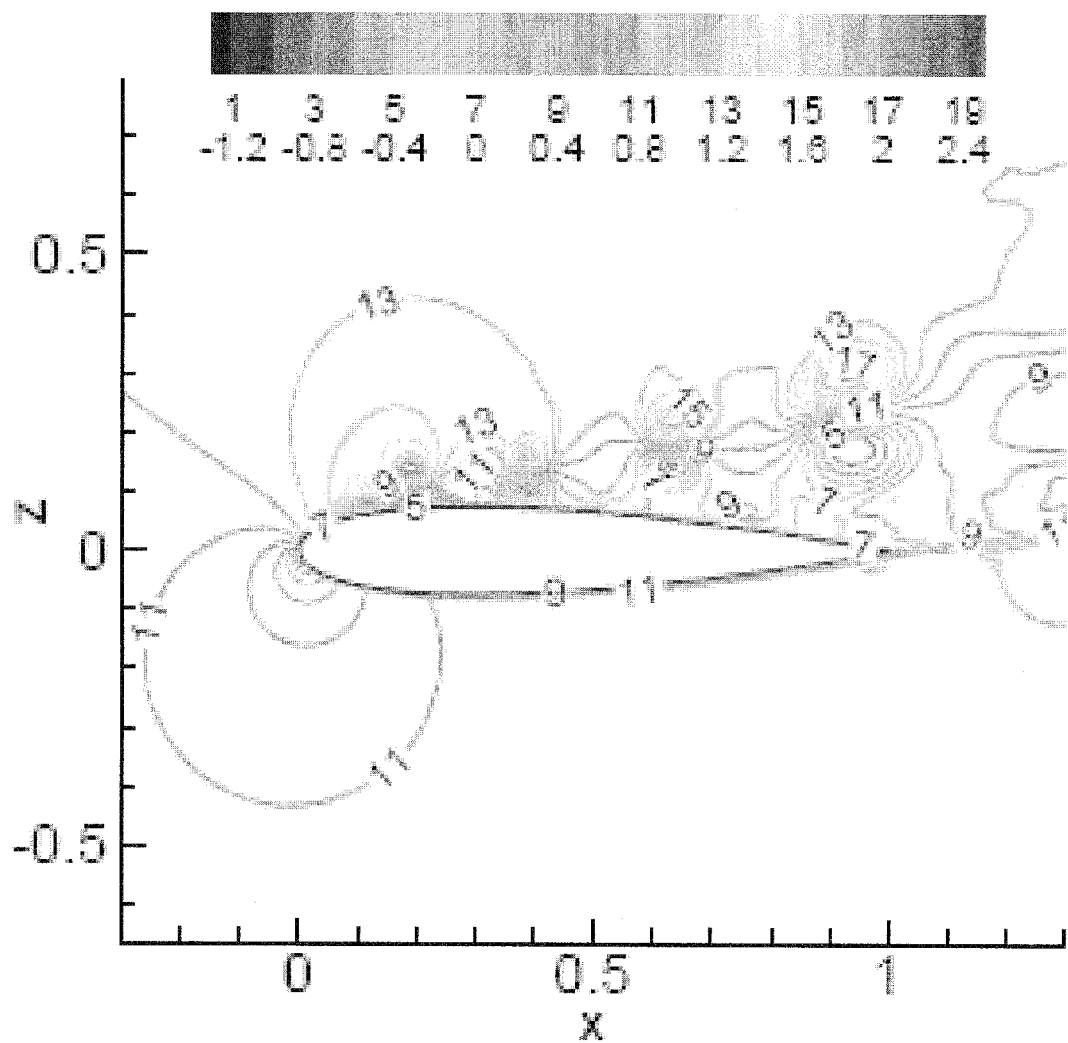
FIG. 9 is a diagram showing streamwise velocity contours illustrating separation.
Figure 10:
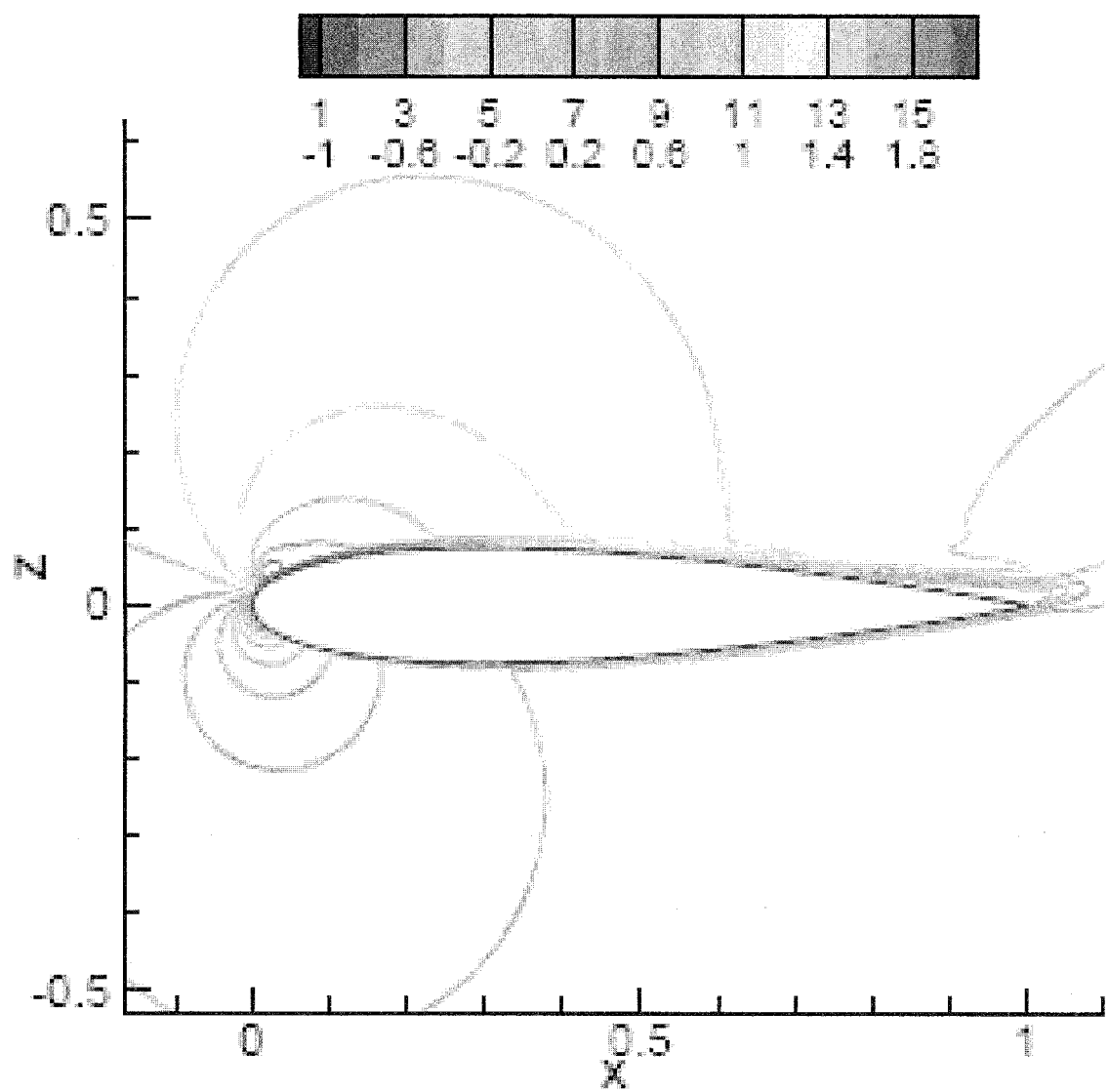
FIG. 10 is a diagram showing the separation mitigated by the application of EHD force.

A first principle electrohydrodynamic (EHD) formulation can be used for modeling plasma discharge induced flows. As an example, FIGS. 6-10 show an active simulation of mitigation of separated flows about a NACA 0015 airfoil at atmospheric pressures and Reynolds number Re=45000. FIG. 6 shows 3-D iso-levels of instantaneous vorticity magnitude colored by the spanwise component of vorticity. The breakdown of the shear layer shortly after separation is evident, generating smaller structures and spanwise instabilities. FIG. 7 is a diagram showing instantaneous EHD force qE at p/2. The two-dimensional baseline flow is rather different than in 3-D because of the absence of a spanwise breakdown mechanism. FIG. 8 is a diagram showing an instantaneous pressure solution. A contour of instantaneous u velocity is shown in FIG. 9. Shed vortices maintain their coherence in an unphysical fashion, giving rise to a sequence of large vortex pair structures that are shed downstream. Peak instantaneous velocities, shown in FIG. 9, are considerably larger in localized regions, reaching almost twice those observed in the 3-D simulations. In a consistent fashion, the instantaneous pressure contours shown in FIG. 8 exhibit coherent features in which extrema are much higher than in the full 3-D simulation. The mean u contours, shown in FIG. 10, show significant qualitative and quantitative differences from both instantaneous 2-D and mean 3-D counterparts, with a lower incline of the separated shear layer relative to the surface of the airfoil. The asymptotic response of the flow to the constant averaged force is unsteady because of the manifestation of separation near the trailing edge and subsequent shedding.

The simulation illustrated in FIGS. 6-10 shows good agreement with reported experimental data. However, these experiments and theoretical predictions have been traditionally limited to low speeds and low power due to the problems of arcing and low conversion of electrical energy into gas momentum. Thus, the embodiments of the subject invention are directed to multibarrier actuators using several layers of dielectric barriers with embedded electrodes for moderate to high speed applications, such as in automobile racing and aircraft applications. Embodiments of the subject multibarrier actuators may vary in the number of insulation layers, insulation thickness, dielectric strength, number of electrodes, electrode width, electrode gap, applied frequency, duty cycle, and voltage, for example.

Traditionally, in electrical glow discharge, a DC voltage potential is placed across two electrodes. If the voltage potential is gradually increased, at the breakdown voltage $V_B$, the current and the amount of excitation of the neutral gas becomes large enough to produce a visible plasma. According to Paschen's law, the breakdown voltage for a particular gas depends on the product (p.d) of the gas pressure and the distance between the electrodes. For any gas, there is a unique p.d value referred to as the Stoletow point where volumetric ionization is the maximum. The Stoletow point for air requires a minimum $V_B$=360 V and p.d=5.7 Torr-mm For flow control applications near atmospheric pressure, the allowable electrode spacing necessary for maximum volumetric ionization is d=0.077 mm. In many applications, specifically in high-speed air vehicles, this is an impractical limitation. One solution to this limitation comes from the development of RF glow discharge using an a.c. voltage potential across the electrodes. The frequency of the current should be such that within a period of the a.c. cycle, electrons travel to the electrodes and generate a charge, while the heavier ions do not. Based on reported experiments, the time-averaged plasma parameters for atmospheric glow discharge has air or other gases at 760±25 torr with relative humidity below 14%. A homogeneous glow can be maintained at about 3 to 10 kHz RF and rms electrode voltage between about 3 to 16 kV. For a gap distance of about 2-5 mm, the electron number density is ~$10^{17}$ m$^{-3}$ and volumetric power dissipation is about 1 MW/m$^3$.

Figure 1:
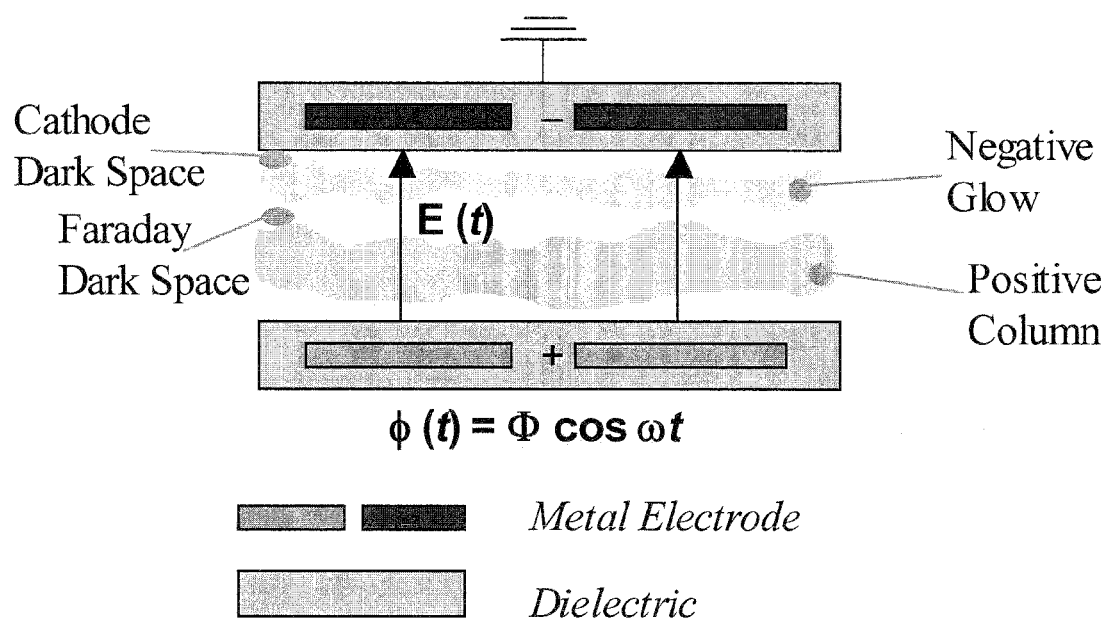
FIG. 1 is a schematic diagram of a standard RF glow discharge monolayer actuator for paraelectric flow control.
Figure 11:
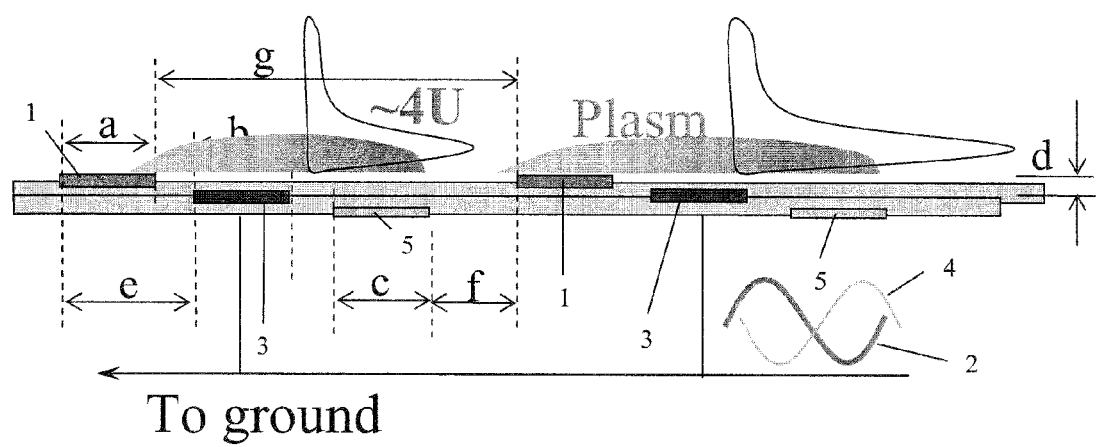
FIG. 11 is a schematic diagram of one embodiment of a multilayer actuator in accordance with the subject invention.

In an embodiment, a multilayer actuator is designed with several layers of dielectric, each incorporating an electrode. FIG. 11 shows a schematic for one embodiment of a bi-layer design as an example. The interelectrode distance d is kept at a few microns, thereby reducing or eliminating the kHz RF power requirement. In a preliminary experiment, the electrodes are powered with wall ac supply (60 Hz) through neon transformers and tested for a stable glow. The voltage pattern 2 shown at the bottom right of FIG. 11 is applied between the electrode 1 nearest the surface and the ground electrode 3 in the middle of the dielectric layers, while voltage pattern 4 is applied between the electrode 5 farthest from the surface and the ground electrode 3. The electrode 1 nearest the surface can be exposed to the fluid in the flow region or can have a coating separating the electrode 1 surface from the fluid in the flow region, depending on the fluid properties (e.g., electrical conductivity) and other design parameters. It was found that the stable glow for the multilayer actuator of FIG. 11 extends to a much greater width than for the typical monolayer design shown in FIGS. 1 and 2. Moreover, the stable discharge at single phase power induces a significantly large body force in an extended region, resulting in a possible order of magnitude increase in wall jet velocity with minimum arcing. Initial measurements show at least four times increase in the induced jet velocity (~4 U). By using a set of phase lagged electrodes powered by a pulsed ac/dc supply, the induced wall jet can be improved by an order of magnitude, such as up to about 7-10 m/s.

Figure 12:
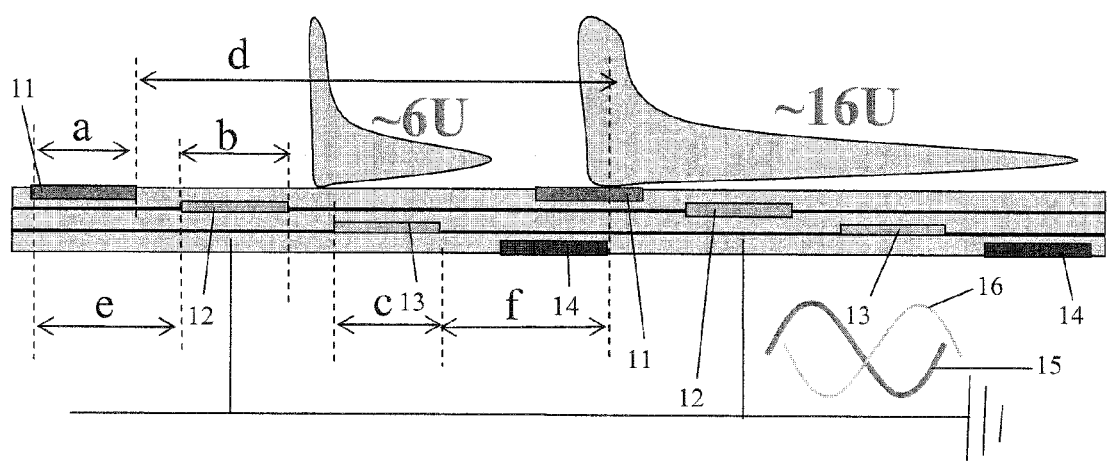
FIG. 12 is a schematic diagram of a second embodiment of a multilayer actuator of the present disclosure, with an increased number of layers.
Figure 13:
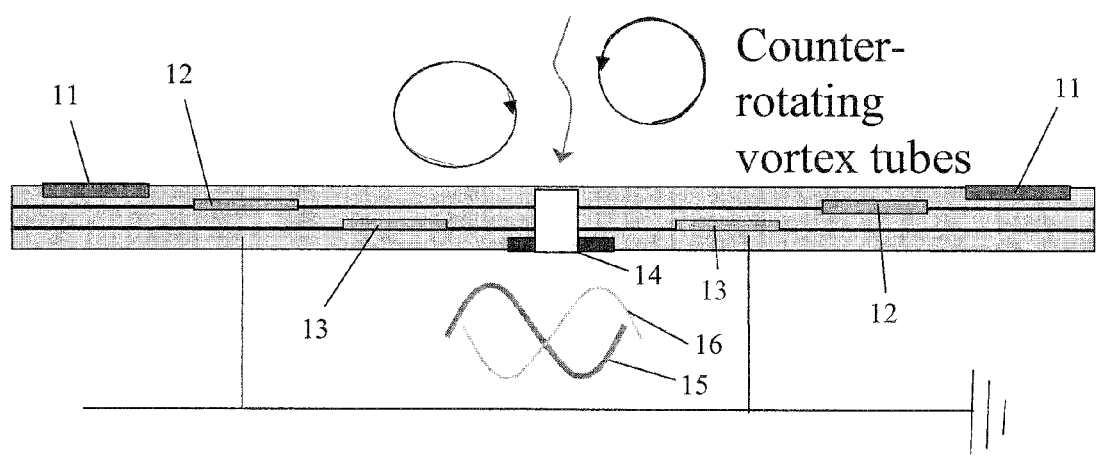
FIG. 13 is a schematic diagram showing that flow actuation may be used for creating large or small counter rotating vortices.

FIG. 12 shows an extremely large acceleration gain (i.e. >15 U induced velocity) for the multilayer arrangement. The voltage pattern 15 is applied between the electrode 11 nearest the surface and the ground electrode 13, while the voltage pattern 16 is applied between electrode 12 and the ground electrode 13. This may be achieved for the same energy density of plasma as of a monolayer arrangement. In additional embodiments, the number of layers can be increased to increase the plasma coated surface area. This means more EHD body force and resulting gas velocity are induced. Also, at this velocity, small scale turbulence may dominate the flow actuation process. Further, the micron level insulator thickness may influence the induced force. The electrodes can be positioned and driven in a variety of configurations and patterns, respectively, to induce a variety of flow patterns. As an example, as shown in FIG. 13, flow actuation may be used for creating large or small counter rotating vortices. Based on the applied phase difference, these counter rotating vortex tubes can be slightly or greatly misaligned. In an embodiment, various vortex structures similar to those forming about different body shapes can be created. For example, the Karman vortex street for flow over a cylindrical object can be easily generated for electrode sets operating at a phase difference of p/2 with a select duty cycle. A powerful alternative for the synthetic jets can also be implemented with this design.

Figure 14:
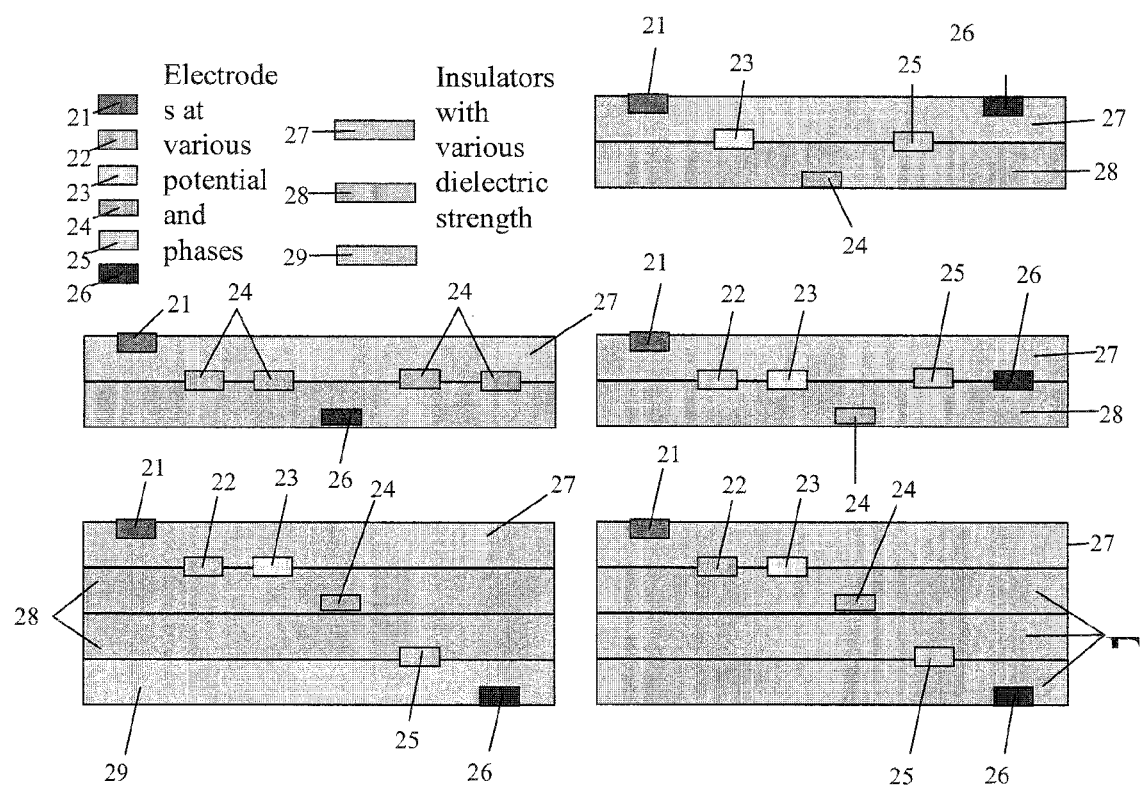
FIG. 14 illustrates several additional exemplary embodiments of the multilayer actuators of the present disclosure.

FIG. 14 illustrates several additional exemplary embodiments of the multilayer actuators in accordance with the subject invention, showing various geometric and electrical configurations. Various insulator materials such as KAPTON™ and TEFLON™ and their combinations, for example, can be utilized for minimum heat loss inside the dielectric material. Multilayer actuators of the present invention may have any number of insulation layers, insulation thicknesses, dielectric strengths, numbers of electrodes, electrode widths, inter-electrode gaps, applied frequencies, duty cycles, and voltages, for example.

Figure 15A:
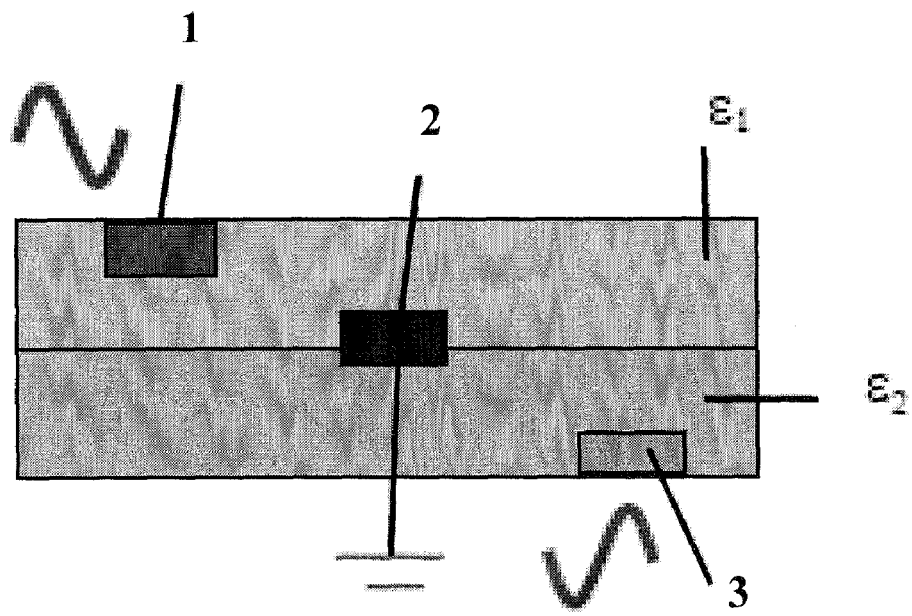
FIGS. 15A and 15B show specific embodiments of the invention having certain relationships between driving voltage and amplitudes and frequencies.
Figure 15B:
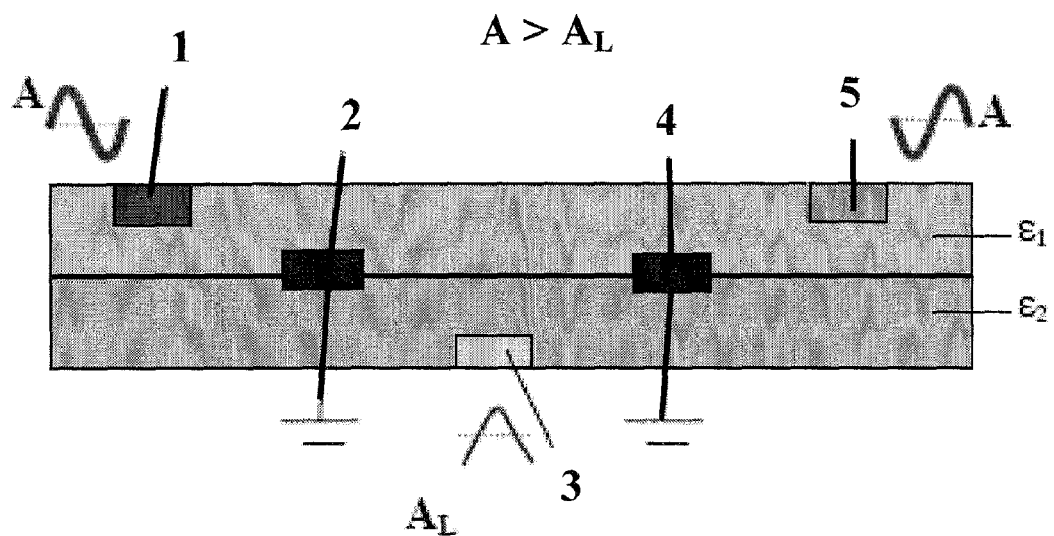

Referring to FIG. 15A, an embodiment is shown where the amplitude, A, and frequency, k, of the voltage applied between electrodes 1 and 2 and between electrodes 3 and 2 is the same. FIG. 15B shows an embodiment where the amplitude, $A_L$, and frequency, $k_L$, applied between electrodes 3 and 2 is different than the amplitude, A, and frequency applied between electrodes 1 and 2 and electrodes 5 and 4.

Figure 2:
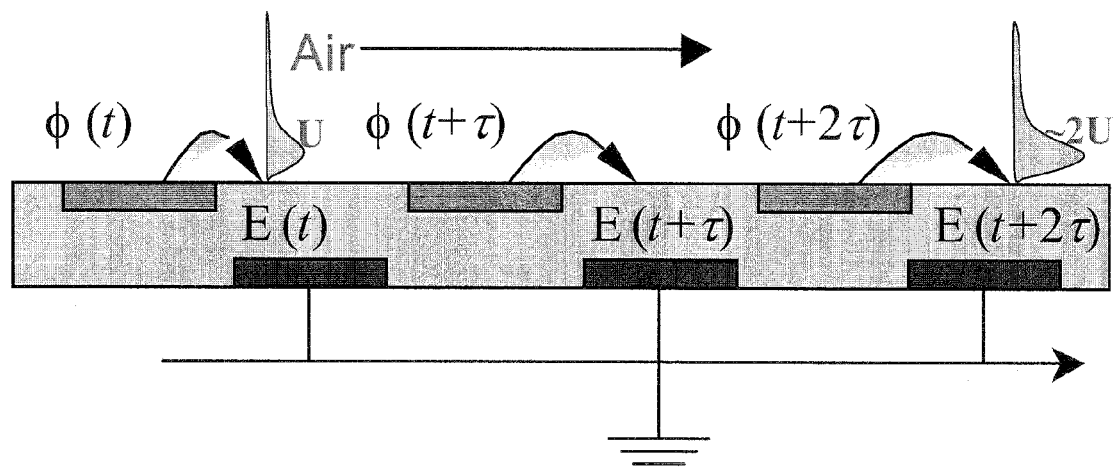
FIG. 2 is a schematic diagram of a standard RF glow discharge monolayer actuator for poly-phase peristaltic flow control.
Figure 16A:
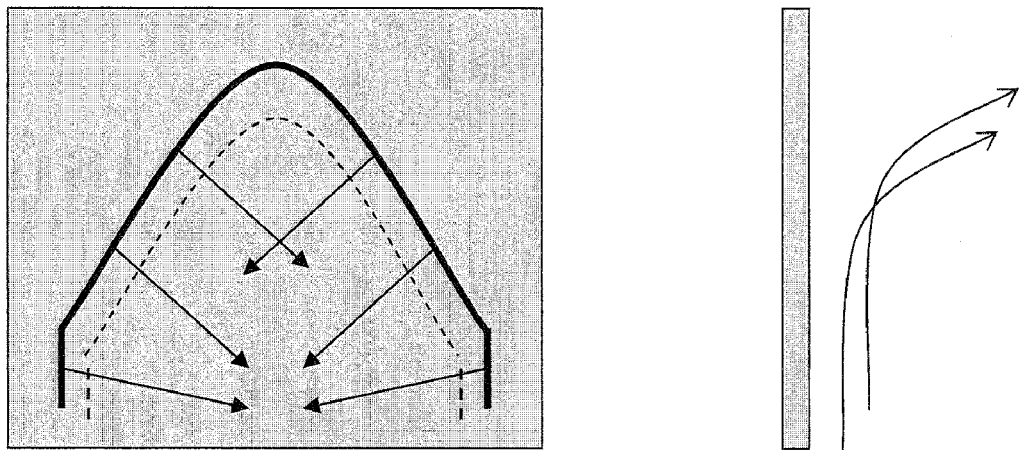
FIGS. 16A and 16B show specific embodiments of the invention for creating a flow force directed away from the substrate.
Figure 16B:
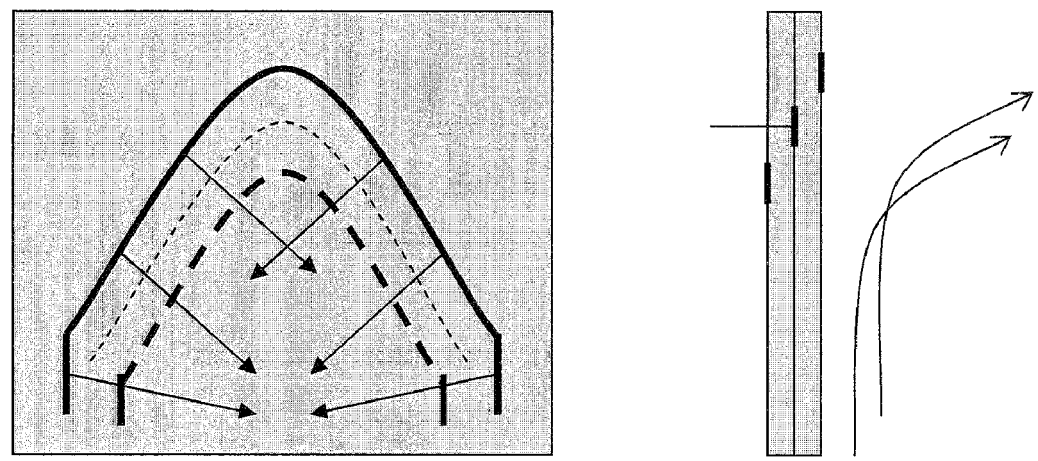

Additional embodiments of the invention can involve electrode structures incorporating curvatures or angles, such as triangle, square, or angle, with respect to the longitudinal dimension of the electrode pattern. Referring to FIGS. 16A and 16B, electrode patterns incorporating such curvatures are shown. FIG. 16A illustrates an electrode pattern having a cross-section as shown in FIG. 2 and the right side of FIG. 16A, where the longitudinal dimension of the electrode pattern incorporates a curvature, as shown on the left side of FIG. 16A. FIG. 16B shows an electrode pattern having a cross-section as shown in FIG. 11 and the right side of FIG. 16B, where the longitudinal dimension of the electrode pattern incorporates a curvature, as shown on the left side of FIG. 16B. The electrode patterns in FIG. 16A and 16B can be used for bulk flow actuation and can create an upward body force away from the surface. The fluid receives a force from a plurality of directions such that fluid collides and is forced upward from surface or down toward surface.

The arrows in FIGS. 16A and 16B show the direction of the flow when looking at a cross-section cut from the top to bottom of the respective electrode pattern with the ground electrode being on the inside of the curvature.

Figure 17A:
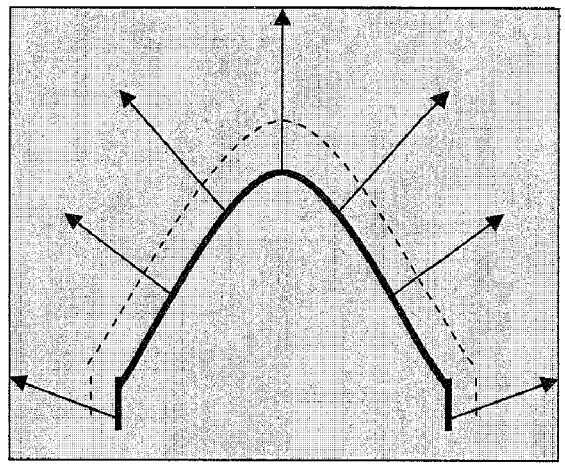
FIGS. 17A and 17B show specific embodiments of the invention for creating a flow force directed toward the substrate.
Figure 17B:
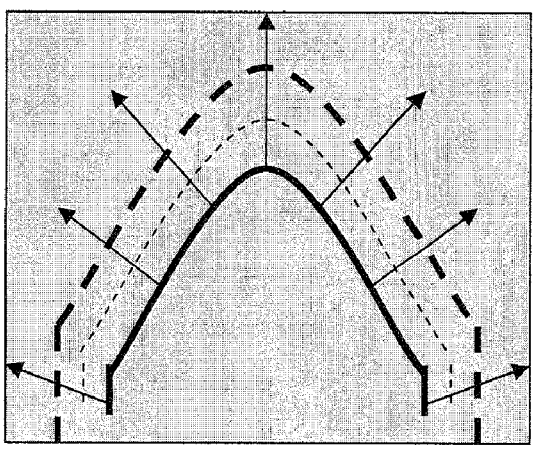

FIGS. 17A and 17B show the electrode patterns of FIGS. 16A and 16B, respectively, with the ground electrode being on the outside of the curvature in FIG. 17A and the electrode driven to create a body force from the inner electrode to the outer electrode. The arrows shown in FIGS. 17A and 17B show the flow created by driving the electrode structures in this manner.

Figure 18:
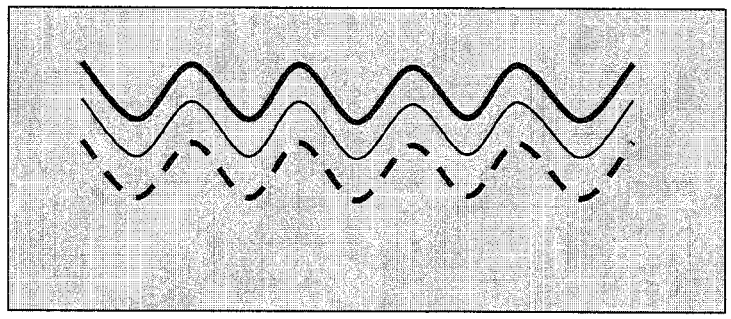
FIG. 18 shows a specific embodiment having a serpentine turbulator design for creating a flow force directed away from the substrate.

FIG. 18 shows an electrode structure having a serpentine turbulator design in the longitudinal dimension. The arrows on the right side show the flow for a cross-section cut from top to bottom where the electrodes are driven to produce a body force from the outer electrode to the inner electrode with respect to one of the curved sections.

Figure 19:
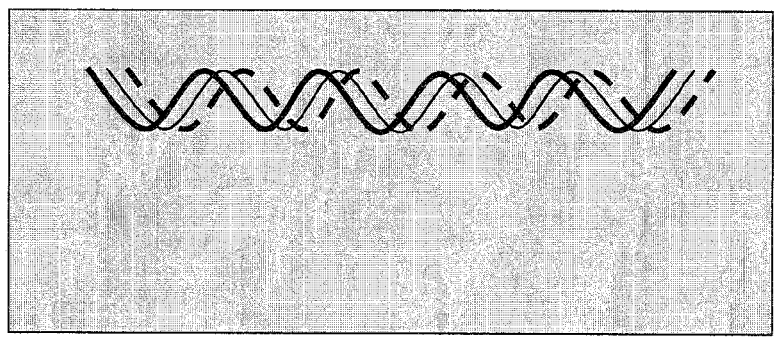
FIG. 19 shows a specific embodiment having a serpentine turbulator design for creating a flow force directed toward the substrate.

FIG. 19 shows another embodiment having a serpentine turbulator design in the longitudinal dimension where the electrode have a different orientation from the electrode pattern in FIG. 18. The arrows show the flow for a cross-section out from top to bottom at a location where the body force is away from the surface.

Figure 20:
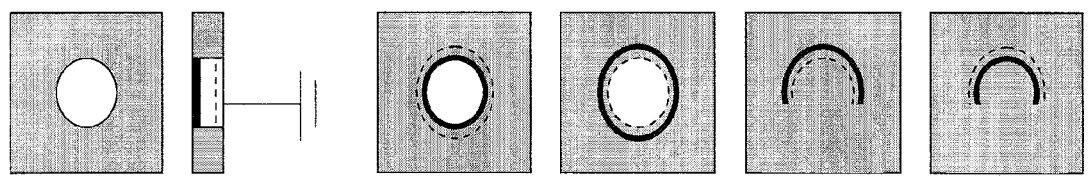
FIG. 20 shows various specific embodiments of the subject invention.

A variety of curvatures can be implemented in accordance with the subject invention. FIG. 20 shows additional embodiments of electrode patterns incorporating curvatures in the longitudinal dimension of the electrodes, including an electrode pattern surrounding an aperture in the substrate and an electrode pattern in the shape of a half circle. Other shapes include, but are not limited to, angles, triangles, rectangles, polygons, and other shapes that vary from straight. The electrode pattern surrounding the aperture can be designed and driven to pull flow up through the aperture or driven to force flow into the aperture. Likewise, the electrode pattern in the half circle can be designed and driven to force flow away from the substrate or designed and driven to pull flow toward the substrate.

Figure 21A:
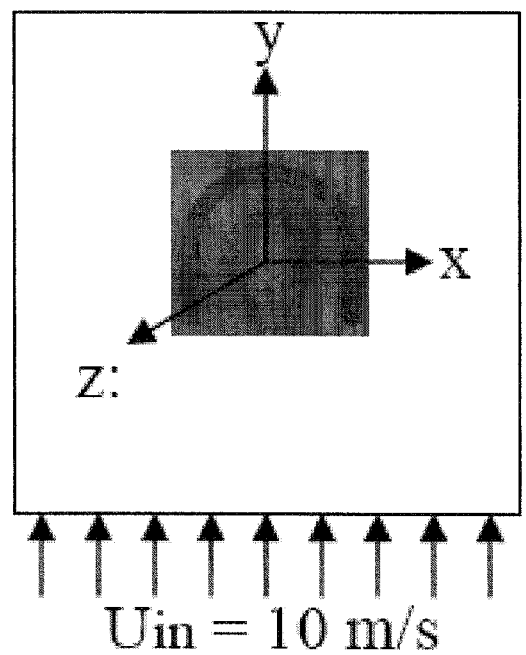
FIGS. 21A and 21B show an embodiment having a horseshoe shaped electrode pattern.
Figure 21B:
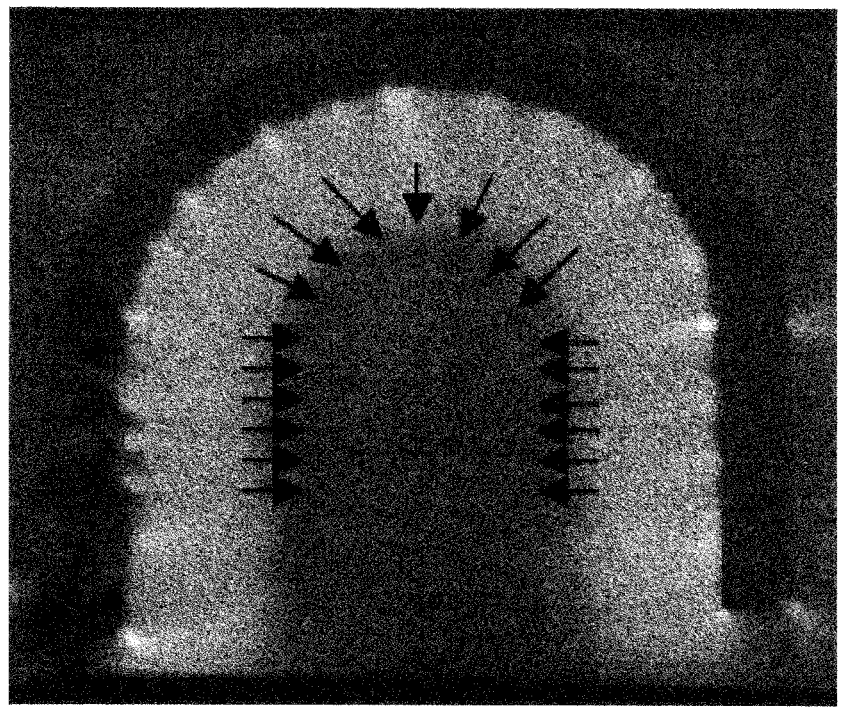
Figure 22:
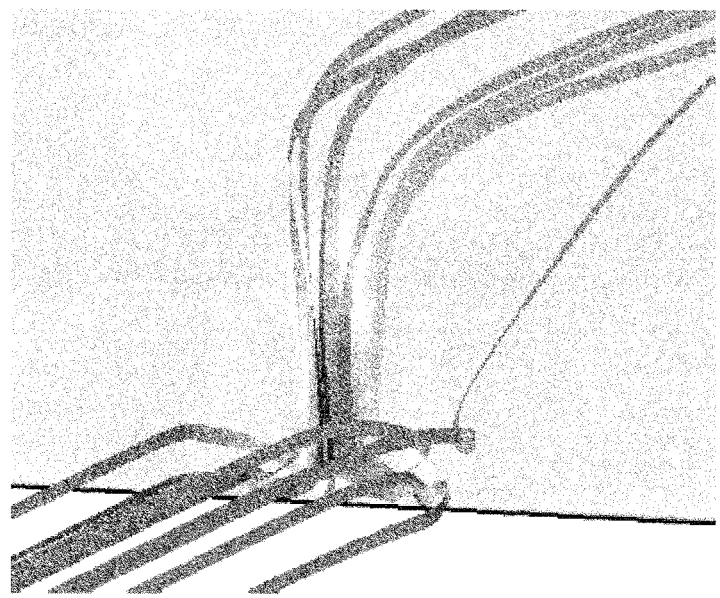
FIG. 22 shows a flow pattern for the embodiment of FIG. 21A.
Figure 23A:
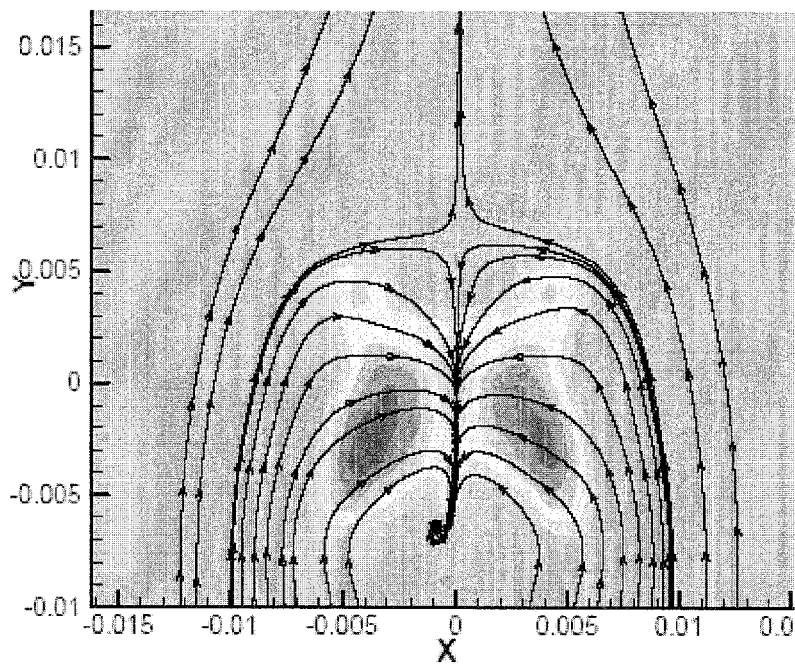
FIGS. 23A-23C show data illustrating the operation of the embodiment of FIG. 21A.
Figure 23B:
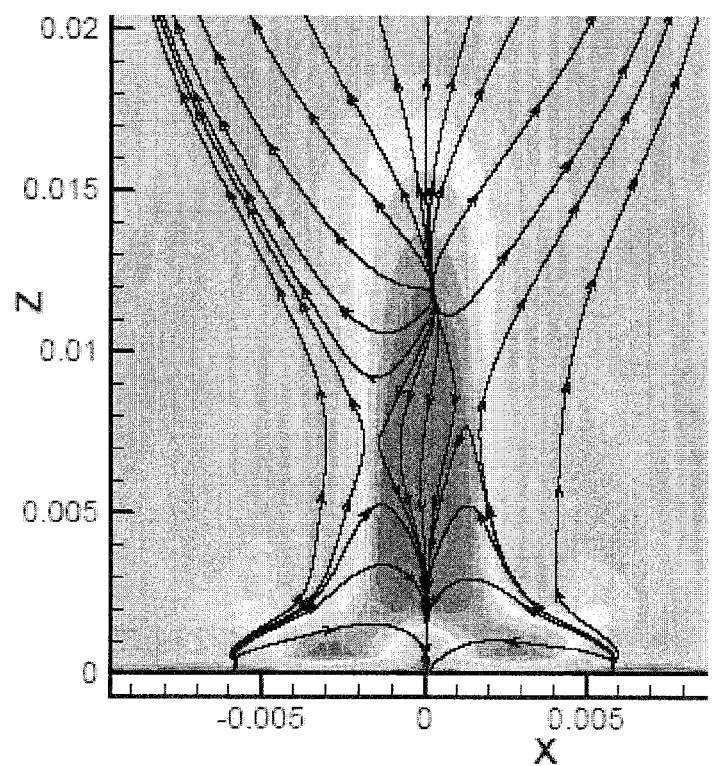
Figure 23C:
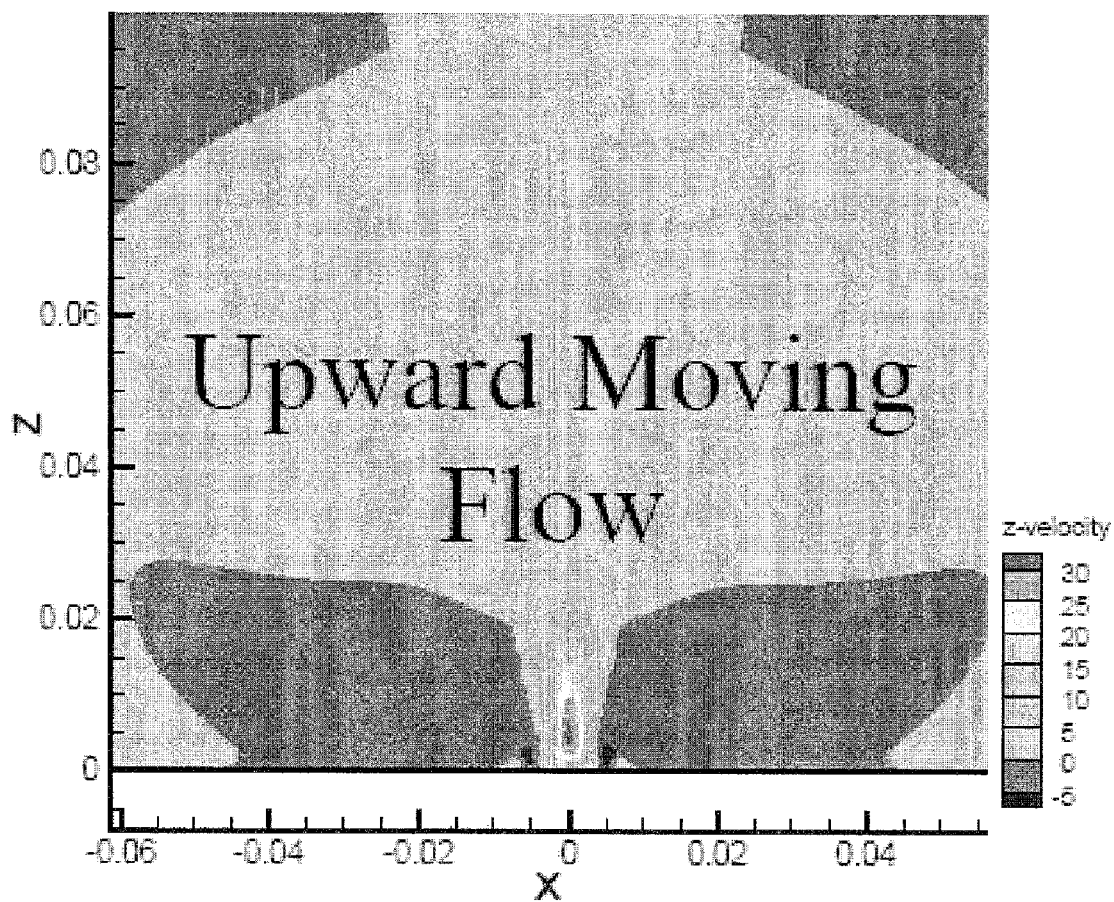

FIGS. 21A and 21B show an electrode pattern similar to the pattern in FIG. 16A and the corresponding glow pattern, respectively. The electrode pattern of FIG. 21A is driven to create the body force from the outer electrode to the inner electrode. FIG. 22 shows flow traces, and FIGS. 23A-23C show data illustrating the upward body force produced by this electrode pattern when driven in this matter where the summation of the flow-force creates an upward flow force.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A plasma actuator, comprising:
   a first power source;
   a first electrode in contact with a first dielectric layer and connected to the first power source;
   a second power source;
   a second electrode in contact with a second dielectric layer and connected to the second power source; and
   a ground electrode;
   wherein the first power source drives the first electrode with a first time-varying voltage pattern with respect to the ground electrode and the second power source drives the second electrode with a second time-varying voltage pattern with respect to the ground electrode, wherein application of the first time-varying voltage pattern produces a first plasma discharge in a flow region and a first electric field pattern in the flow region, wherein application of the second time-varying voltage pattern produces a second plasma discharge in the flow region and a second electric field pattern in the flow region, wherein the first time-varying voltage pattern and the second voltage time varying pattern have a phase difference.

2. The plasma actuator according to claim 1, wherein the first plasma discharge and the first electric field pattern create a first body force on a fluid in the flow region, wherein the second plasma discharge and the second electric field pattern create a second body force on the fluid in the flow region.

3. The plasma actuator according to claim 2, wherein the first body force is an electrodynamic force.

4. The plasma actuator according to claim 2, wherein the first body force is a Lorentz force.

5. The plasma actuator according to claim 2, wherein the fluid is a gas.

6. The plasma actuator according to claim 2, wherein the fluid is a liquid.

7. The plasma actuator according to claim 1, wherein the first time varying voltage pattern is an ac voltage pattern.

8. The plasma actuator according to claim 1, wherein the first time varying voltage pattern is pulsed dc voltage pattern.

9. The plasma actuator according to claim 1, where the first dielectric and the second dielectric layer are arranged in a stacked configuration, wherein the first dielectric layer contacts the second dielectric layer.

10. The plasma actuator according to claim 1, wherein the first electrode is exposed to the flow region.

11. The plasma actuator according to claim 1, further comprising a coating between the first electrode and the flow region.

12. The plasma actuator according to claim 3, wherein at least a portion of the first dielectric layer is positioned between the flow region and the second electrode.

13. The plasma actuator according to claim 1, wherein the first dielectric layer and the second dielectric layer have different dielectric strengths.

14. The plasma actuator according to claim 1, wherein the first dielectric layer and the second dielectric layer have the same dielectric strength.

15. The plasma actuator according to claim 1, wherein the first electrode is offset from the second electrode in a direction parallel to a direction of flow in the flow region.

16. The plasma actuator according to claim 1, wherein a surface of the first dielectric layer is exposed to the flow region.

17. The plasma actuator according to claim 16, wherein a direction of flow in the flow region is substantially parallel to the surface of the first dielectric layer in the flow region.

18. The plasma actuator according to claim 17, wherein the first electrode is offset from the second electrode in a direction parallel to the direction of the flow in the flow region.

19. The plasma actuator according to claim 1, wherein the first power source and the second power source are the same.

20. The plasma actuator according to claim 1, further comprising:
    at least one additional power source;
    a corresponding at least one additional electrode in contact with a corresponding at least one additional dielectric layer and connected to the corresponding at least one additional power source;
    wherein the at least one additional power source drives the corresponding at least one additional electrode with a corresponding at least one additional ac voltage pattern with respect to the ground electrode, wherein application of the at least one additional ac voltage pattern produces a corresponding at least one additional plasma discharge in the flow region and a corresponding at least one additional electric field pattern in the flow region.

21. The plasma actuator according to claim 1, where the first time-varying voltage pattern and the second time-varying voltage pattern are RF voltage patterns.

22. The plasma actuator according to claim 1, wherein the first electrode, the second electrode, and the ground electrode comprise a curve in a longitudinal dimension of the respective electrode.

23. The plasma actuator according to claim 1, wherein the first electrode, the second electrode, and the ground electrode comprise an angle in a longitudinal dimension of the respective electrode.

24. The plasma actuator according to claim 22, wherein the first dielectric layer is adjacent to the flow region wherein a net body force on a fluid in the flow region comprises a component normal to a surface of the first dielectric layer.

25. The plasma actuator according to claim 23, wherein the first dielectric layer is adjacent to the flow region wherein a net body force on a fluid in the flow region comprises a component normal to a surface of the first dielectric layer.

26. A method of plasma actuation, comprising:
    providing a first power source;
    providing a first electrode in contact with a first dielectric layer and connected to the first power source;
    providing a second power source;
    providing a second electrode in contact with a second dielectric layer and connected to the second power source; and
    providing a ground electrode;
    driving the first electrode via the first power source with a first time-varying voltage pattern with respect to the ground electrode and driving the second electrode via the second power source with a second time-varying voltage pattern with respect to the ground electrode, wherein application of the first time-varying voltage pattern produces a first plasma discharge in a flow region and a first electric field pattern in the flow region, wherein application of the second time-varying voltage pattern produces a second plasma discharge in the flow region and a second electric field pattern in the flow region, wherein the first time-varying voltage pattern and the second voltage time varying pattern have a phase difference.

27. The method according to claim 26, wherein the first plasma discharge and the first electric field pattern create a first body force on a fluid in the flow region, wherein the second plasma discharge and the second electric field pattern create a second body force on the fluid in the flow region.

28. The method according to claim 27, wherein the first body force is an electrodynamic force.

29. The method according to claim 27, wherein the first body force is a Lorentz force.

30. The method according to claim 27, wherein the fluid is a gas.

31. The method according to claim 27, wherein the fluid is a liquid.

32. The method according to claim 27, wherein the first time varying voltage pattern is an ac voltage pattern.

33. The method according to claim 26, wherein the first time varying voltage pattern is pulsed dc voltage pattern.

34. The method according to claim 26, where the first dielectric and the second dielectric layer are arranged in a stacked configuration, wherein the first dielectric layer contacts the second dielectric layer.

35. The method according to claim 26, wherein the first electrode is exposed to the flow region.

36. The method according to claim 26, further comprising providing a coating between the first electrode and the flow region.

37. The method according to claim 28, wherein at least a portion of the first dielectric layer is positioned between the flow region and the second electrode.

38. The method according to claim 26, wherein the first dielectric layer and the second dielectric layer have different dielectric strengths.

39. The method according to claim 26, wherein the first dielectric layer and the second dielectric layer have the same dielectric strength.

40. The method according to claim 26, wherein the first electrode is offset from the second electrode in a direction parallel to a direction of flow in the flow region.

41. The method according to claim 26, wherein a surface of the first dielectric layer is exposed to the flow region.

42. The method according to claim 41, wherein a direction of flow in the flow region is substantially parallel to the surface of the first dielectric layer in the flow region.

43. The method according to claim 42, wherein the first electrode is offset from the second electrode in a direction parallel to the direction of the flow in the flow region.

44. The method according to claim 26, wherein the first power source and the second power source are the same.

45. The method according to claim 26, further comprising:
providing at least one additional power source;
providing a corresponding at least one additional electrode in contact with a corresponding at least one additional dielectric layer and connected to the corresponding at least one additional power source;
driving the corresponding at least one additional electrode via the at least one additional power source with a corresponding at least one additional ac voltage pattern with respect to the ground electrode, wherein application of the at least one additional ac voltage pattern produces a corresponding at least one additional plasma discharge in the flow region and a corresponding at least one additional electric field pattern in the flow region.

46. The method according to claim 26, where the first time-varying voltage pattern and the second time-varying voltage pattern are RF voltage patterns.

47. The method according to claim 26, wherein the first electrode, the second electrode, and the ground electrode comprise a curve in a longitudinal dimension of the respective electrode.

48. The method according to claim 26, wherein the first electrode, the second electrode, and the ground electrode comprise an angle in a longitudinal dimension of the respective electrode.

49. The method according to claim 47, wherein the first dielectric layer is adjacent to the flow region wherein a net body force on a fluid in the flow region comprises a component normal to a surface of the first dielectric layer.

50. The method according to claim 48, wherein the first dielectric layer is adjacent to the flow region wherein a net body force on a fluid in the flow region comprises a component normal to a surface of the first dielectric layer.

* * * * *

UNITED STATES PATENT AND TRADEMARK OFFICE
CERTIFICATE OF CORRECTION

PATENT NO. : 8,235,072 B2  
APPLICATION NO. : 12/598993  
DATED : August 7, 2012  
INVENTOR(S) : Subrata Roy Page 1 of 1

It is certified that error appears in the above-identified patent and that said Letters Patent is hereby corrected as shown below:

Column 1,  
Line 6, "APPLICATION" should read --APPLICATIONS--.

Column 8,  
Line 32, "electrode have" should read --electrodes have--.

Column 9,  
Lines 22-23, "second voltage time varying pattern" should read  
    --second time-varying voltage pattern--.

Column 10,  
Line 61, "second voltage time varying pattern" should read  
    --second time-varying voltage pattern--.

Signed and Sealed this  
Twenty-sixth Day of February, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,235,072 B2  
APPLICATION NO. : 12/598993  
DATED : August 7, 2012  
INVENTOR(S) : Subrata Roy Page 1 of 1

It is certified that error appears in the above-identified patent and that said Letters Patent is hereby corrected as shown below:

In the Specification

Column 1,  
Lines 14-16, "The subject invention was made with government support under a research project supported by AFOSR Grant Nos. FA9550-05-1-0074 and FA9550-07-1-0131."

should read

--The subject invention was made with government support under a research project supported by AFOSR Grant Nos. FA9550-05-1-0074 and FA9550-07-1-0131. The government has certain rights in the invention--.

Signed and Sealed this  
Thirtieth Day of July, 2013

Teresa Stanek Rea  
*Acting Director of the United States Patent and Trademark Office*